(12) United States Patent
Flowers et al.

(10) Patent No.: US 10,497,393 B1
(45) Date of Patent: Dec. 3, 2019

(54) METHODS AND SYSTEMS FOR STORING DATA SEQUENTIALLY ON A MEDIA

(71) Applicant: Wasabi Technologies, Inc., Boston, MA (US)

(72) Inventors: Jeff Flowers, Boston, MA (US); Mark Rees, Boston, MA (US)

(73) Assignee: Wasabi Technologies, Inc., Boston, MA (US)

( * ) Notice: Subject to any disclaimer, the term of this patent is extended or adjusted under 35 U.S.C. 154(b) by 0 days.

(21) Appl. No.: 16/288,339

(22) Filed: Feb. 28, 2019

Related U.S. Application Data

(60) Provisional application No. 62/702,083, filed on Jul. 23, 2018.

(51) Int. Cl.
*G11B 20/12* (2006.01)
*G06F 3/06* (2006.01)
*G11B 20/00* (2006.01)
*G11B 27/10* (2006.01)
*G11B 5/012* (2006.01)

(52) U.S. Cl.
CPC ........ *G11B 20/1217* (2013.01); *G06F 3/0619* (2013.01); *G06F 3/0623* (2013.01); *G06F 3/0644* (2013.01); *G06F 3/0683* (2013.01); *G11B 5/012* (2013.01); *G11B 20/00217* (2013.01); *G11B 27/105* (2013.01); *G11B 2020/1238* (2013.01)

(58) Field of Classification Search
CPC . G11B 5/86; G11B 2020/10833; G11B 27/30; G11B 27/36; G11B 20/12; G11B 7/24035; G11B 2007/0013; G11B 2020/1265; G06F 2212/33; G06F 2212/312; G06F 2212/313; G06F 2212/96; G06F 16/11; G06F 3/0604; G06F 3/06; G06F 3/0608; H04N 21/231; H04N 21/23103; H04N 21/2311; H04L 47/70; H04Q 2213/13176
See application file for complete search history.

(56) References Cited

U.S. PATENT DOCUMENTS 7,146,424 B2 * 12/2006 Douceur ................. H04L 29/06
709/231

* cited by examiner

Primary Examiner — Nabil Z Hindi
(74) Attorney, Agent, or Firm — Foley & Lardner LLP

(57) ABSTRACT

Systems and methods for storing data are provided herein using a data archive architecture controlled by a head server. The head server can write data in a contiguous manner across multiple storage devices by partitioning objects into multiple portions and spreading the portions across the multiple storage devices. Portions of a first object can be transmitted to a first subset of storage devices and portions of a second object can be transmitted to a second subset of storage devices. The first subset of storage devices can write the portions of the first object to a first write location indicated by a write pointer. The head server can increment the write pointer based on a length of the portions of the first object to a second write location. The second subset of storage devices can write the portions of the second object to the second write location.

20 Claims, 8 Drawing Sheets

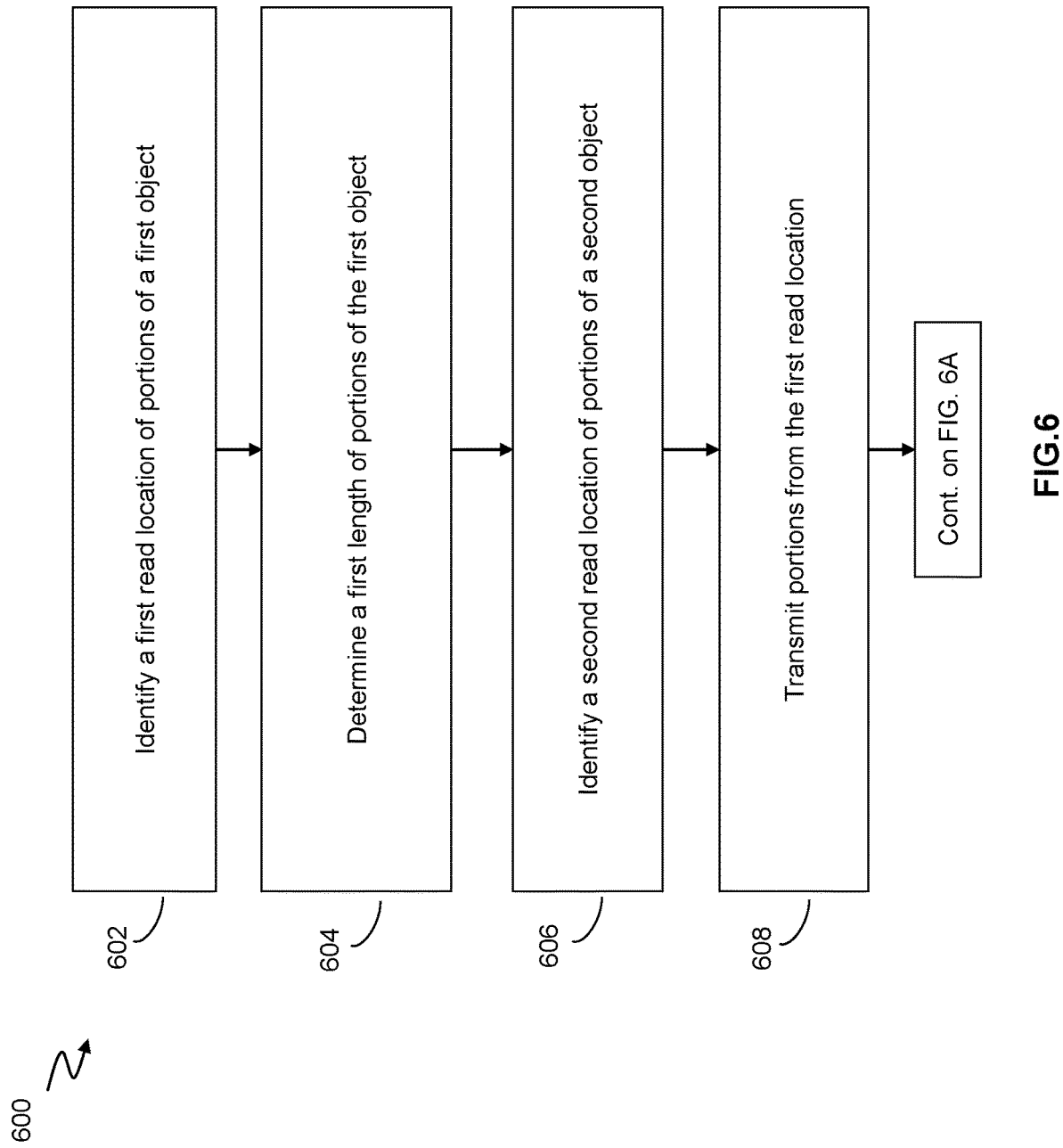

METHODS AND SYSTEMS FOR STORING DATA SEQUENTIALLY ON A MEDIA

CROSS-REFERENCE TO RELATED APPLICATION

The present application claims the benefit of priority under 35 U.S.C. § 119(e) to U.S. Provisional Application 62/702,083, filed on Jul. 23, 2018, titled "SYSTEMS AND METHODS FOR STORING DATA," which is incorporated herein by reference in its entirety.

BACKGROUND

Data storage systems can rely on a fixed block architecture or fixed blocks of data to record information in a storage medium, whereby each disk has the same size. The fixed block architecture can result in efficient use of the storage space and reduce the overall capacity and performance of the respective data storage system. For example, the data storage systems may be limited to providing memory in chunks corresponding to the size of the fixed block and resulting in wasted or unused capacity.

SUMMARY

Embodiments of systems and methods for storing and reading data sequentially on a media are provided herein. In particular, a data archive architecture using storage devices or high-density magnetic disk drives controlled by remote head servers (hereinafter "head server") based on file storage metadata managed in a database is provided herein. The head server can write data in a contiguous manner across multiple storage devices to enable a higher percentage of the respective storage devices to be utilized. For example, the head server can partition objects or other forms of data into multiple portions and spread the portions across multiple storage devices (e.g., across 20 storage devices) in a contiguous track and read back the portions in a contiguous track. In some embodiments, larger files can be stored as shards distributed across multiple storage devices.

Metadata corresponding to the portioned objects can be stored at an independent or remote storage medium, remote from the storage devices, such that more space can be utilized on the storage devices. For example, the storage medium can include a database implemented on hardware distinct from the managed storage devices.

The head servers control the storage devices in a one-to-many ratio, where a single head server may control dozens of storage devices. In one embodiment, an installation may have one database hosted in a distributed fashion across multiple database servers accessible to multiple head servers. Each head server may be primarily responsible for a dozen to five dozen storage devices (which may each have multiple internal media platters). In some configurations, head servers may have secondary responsibilities for an extended number of storage devices in order to handle variations in throughput requirements, failover scenarios, and other benefits of redundancy. Thus, the systems and methods described herein can allow for massive scaling and can be scaled at least in part on an amount of data to be stored (e.g., scalable to hundreds of exabytes). For example, a single deployment may have sixty drives per primary head server in a network of twelve hundred drives.

The storage devices (e.g., high-density magnetic disk drives) can be selected to prioritize data retrieval requirements over data write requirements. The nature of the data warehouse is that most data stored in the warehouse is written once and then retained, unedited. Accordingly, the write requirements can be reasonably subordinated to retrieval requirements. For example, the storage devices can utilize shingled magnetic recording (SMR) to compactly write data to a disk track in a manner that writes to both the data-destination track and also the next adjacent track, effectively destroying any data that may have been stored on the adjacent track.

The head servers can remove file management responsibilities from the storage devices to create a that doesn't need to divide the drives into blocks and allows for arbitrary file aln sizes. For example, data can be written to disks as contiguous data or portions called blocks. The head server can control the storage devices using metadata stored in a distinct database not stored on the same media as the files. The database may have internal data storage requirements that are different from the rest of the data warehouse and the database storage media can be selected to satisfy these distinct requirements.

In at least one aspect, a method for storing data sequentially on a media is provided. The method includes receiving, by a head server in communication with a plurality of storage devices, a first object and a second object, and dividing, by the head server, the first object into a first plurality of portions and the second object into a second plurality of portions. Each of the first plurality of portions have a first length and each of the second plurality of portions have a second length.

The method further includes transmitting, by the head server, each of the first plurality of portions to a respective one of the first subset of the plurality of storage devices, and writing, by each of a first subset of the plurality of storage devices, a respective one of the first plurality of portions to a first write location indicated by a write pointer. The first write location can be the same for each of the first subset of the plurality of storage devices. The method further includes incrementing, by the head server, the write pointer to a second write location based on the first length, transmitting, by the head server, each of the second plurality of portions to a respective one of the second subset of the plurality of storage devices, and writing, by each of a second subset of the plurality of storage devices, a respective one of the second plurality of portions to the second write location. The second write location can be the same for each of the second subset of the plurality of storage devices.

In at least one aspect, a system to store data sequentially on a media is provided. The system includes a head server in communication with a plurality of storage devices. The head server is configured to receive a first object and a second object and divide the first object into a first plurality of portions and the second object into a second plurality of portions. Each of the first plurality of portions have a first length and each of the second plurality of portions have a second length.

The head server is further configured to transmit each of the first plurality of portions to a respective one of the first subset of the plurality of storage devices, increment the write pointer to a second write location based on the first length, and transmit each of the second plurality of portions to a respective one of the second subset of the plurality of storage devices.

The plurality of storage devices are configured to write, for example by each of a first subset of the plurality of storage devices, a respective one of the first plurality of portions to a first write location indicated by a write pointer. The first write location is the same for each of the first subset of the plurality of storage devices. The plurality of storage devices are further configured to write, for example by each of a second subset of the plurality of storage devices, a respective one of the second plurality of portions to the second write location. The second write location is the same for each of the second subset of the plurality of storage devices.

In at least one aspect, a method to read data sequentially on a media is provided. The method can include identifying, by a head server in communication with a plurality of storage devices, a first read location corresponding to a first plurality of portions of a first object. The method can include determining, by the head server, a first length of the first plurality of portions of the first object. The method can include identifying, by the head server, a second read location corresponding to a second plurality of portions of a second object using the first length. The method can include transmitting, by respective ones of the first subset of plurality of storage devices, each of the first plurality of portions from the first read location to the head server. The method can include reading, by the head server, the first plurality of portions of the first object from the first subset of plurality of storage devices. The method can include incrementing, by the head server, a read pointer from the first read location to the second read location based on the first length. The method can include transmitting, by respective ones of the second subset of plurality of storage devices, each of the second plurality of portions from the second read location to the head server. The method can include reading, by the head server, the second plurality of portions of the second object from the second subset of plurality of storage devices.

In some embodiments, the method can include organizing, by the head server, the first subset of the plurality of storage devices in a first contiguous order. The method can include organizing, by the head server, the second subset of the plurality of storage devices in a second contiguous order. The method can include reading, by the head server, the first plurality of portions forming the first object from the first subset of the plurality of storage devices in the first contiguous order. The method can include reading, by the head server, the second plurality of portions forming the second object from the second subset of the plurality of storage devices in the second contiguous order. The method can include combining, by the head server, the first plurality of portions to form the first object combining, by the head server, the second plurality of portions to form the second object.

In some embodiments, the method can include storing the first read location corresponding to the first plurality of portions and the second read location corresponding to the second plurality of portions to a storage media independent from the plurality storage devices. The method can include extracting the first read location corresponding to the first plurality of portions and the second read location corresponding to the second plurality of portions to a storage media independent from the plurality storage devices. The method can include identifying the first read location for a first one of the first plurality of portions of the first object from a storage media independent from the plurality storage devices. The method can include identifying the second read location for a first one of the second plurality of portions of the second object from the storage media independent from the plurality storage devices.

In some embodiments, the method can include identifying metadata corresponding to the first object stored in at least one entry of a storage media independent from the plurality storage devices. The method can include determining an encryption key for the first object from the metadata. The method can include decrypting the first object with the encryption key. The method can include reading, by the head server, one of the plurality of the first portions from a first block stored on a temporary storage medium. The method can include reading, by the head server, one of the plurality of the second portions from the first block stored on the temporary storage medium. In embodiments, the second subset of the plurality of storage devices can be different than the first subset of the plurality of storage devices.

In at least one aspect, a system to read data sequentially on a media is provided. The system can include a head server in communication with a plurality of storage devices. The head server can be configured to identify a first read location corresponding to a first plurality of portions of a first object. The head server can be configured to determine a first length of the first plurality of portions of the first object. The head server can be configured to identify a second read location corresponding to a second plurality of portions of a second object using the first length. The head server can be configured to read the first plurality of portions of the first object from a first subset of the plurality of storage devices. The head server can be configured to increment a read pointer from the first read location to the second read location based on the first length. The head server can be configured to read the second plurality of portions of the second object from a second subset of the plurality of storage devices. In embodiments, respective ones of the first subset of plurality of storage devices can be configured to transmit each of the first plurality of portions from the first read location to the head server. In embodiments, respective ones of the second subset of plurality of storage devices configured to transmit each of the second plurality of portions from the second read location to the head server.

In some embodiments, the head server can be configured to organize the first subset of the plurality of storage devices in a first contiguous order and organize the second subset of the plurality of storage devices in a second contiguous order. The head server can be configured to read the first plurality of portions forming the first object from the first subset of the plurality of storage devices in the first contiguous order and read the second plurality of portions forming the second object from the second subset of the plurality of storage devices in the second contiguous order. The head server can be configured to combine the first plurality of portions to form the first object and combine the second plurality of portions to form the second object.

In some embodiments, the head server can be configured to store the first read location corresponding to the first plurality of portions and the second read location corresponding to the second plurality of portions to a storage media independent from the plurality storage devices. The head server can be configured to extract the first read location corresponding to the first plurality of portions and the second read location corresponding to the second plurality of portions from a storage media independent from the plurality storage devices. The head server can be configured to identify the first read location for a first one of the first plurality of portions of the first object from a storage media independent from the plurality storage devices and identify the second read location for a first one of the second plurality of portions of the second object from the storage media independent from the plurality storage devices.

In some embodiments, the head server can be configured to identify metadata corresponding to the first object stored in at least one entry of a storage media independent from the plurality storage devices. The head server can be configured to determine an encryption key for the first object from the metadata and decrypt the first object with the encryption key. The head server can be configured to read one of the plurality of the first portions from a first block stored on a temporary storage medium and read one of the plurality of the second portions from the first block stored on the temporary storage medium. In embodiments, the second subset of the plurality of storage devices is different than the first subset of the plurality of storage devices.

In at least one aspect, a method to store data sequentially on a media is provided. The method can include receiving, by a head server in communication with a plurality of storage devices, a first object. The method can include dividing, by the head server, the first object into a first portion having a first length and a second portion having a second length, the first length different from the second length. The method can include transmitting, by the head server, the first portion to a first storage device of the plurality of storage devices. The method can include writing, by the first storage device, the first portion to a first write location of the first storage device indicated by a write pointer. The method can include incrementing, by the head server, the write pointer to a second write location based on the first length, the second write location of the first storage device. The method can include transmitting, by the head server, a first subset of the second portion to the first storage device and a second subset of the second portion to a second storage device of the plurality of storage devices. The method can include writing, by the first storage device, the first subset of the second portion to the second write location of the first storage device, the second write location in a contiguous order indicated by a write pointer. The method can include incrementing, by the head server, the write pointer to a third write location of the second storage device. The method can include writing, by the second storage device, the second subset of the second portion to the third write location of the second storage device. The first portion and the second portion can be stored in a contiguous order from the first storage device to the second storage device.

In some embodiments, the method can include determining a first subset length of the first subset of the second portion and a second subset length of the second subset of the second portion and incrementing, by the head server, the write pointer to the third write location based on the first subset length of the first subset of the second portion. The method can include assigning write locations to each of the storage devices of the plurality of storage devices in a contiguous order. The method can include organizing the first storage device and the second storage device in a contiguous track in the plurality of storage devices. The method can include determining storage sizes for each of the storage devices of the plurality of storage devices. The method can include determining the first storage device has a first storage size and the second storage device has a second storage size. The first storage size can be different from the second storage size.

In some embodiments, the method can include extracting metadata from the first object and storing the metadata corresponding to the first object to a storage media independent from the plurality storage devices. The method can include storing the first write location corresponding to the first portion, the second write location corresponding to the first subset of the second portion, and the third write location corresponding to the second subset of the second portion to a storage media independent from the plurality storage devices. The method can include writing the first portion and the second portion with disk media using shingled magnetic recording (SMR) disk drives. The method can include determining the first write location of the first storage device using a first hash calculation. The method can include generating an encryption key for the first object, encrypting the first object with the encryption key, and recording the encryption key with the first write location.

In at least one aspect, a system to store data sequentially on a media is provided. The system can include a head server in communication with a plurality of storage devices. The head server can be configured to receive a first object and divide the first object into a first portion having a first length and a second portion having a second length. The first length can be different from the second length. The head server can be configured to transmit the first portion to a first storage device of the plurality of storage devices indicated by a first write location at the first storage device. The head server can be configured to increment a write pointer to a second write location based on the first length, the second write location of the first storage device. The head server can be configured to transmit a first subset of the second portion to the first storage device and a second subset of the second portion to a second storage device of the plurality of storage devices and increment the write pointer to a third write location of the second storage device. The first storage device can be configured to write the first portion to the first write location of the first storage device and write the first subset of the second portion to the second write location of the first storage device. The second storage device can be configured to write the second subset of the second portion to the third write location of the second storage device. The first portion and the second portion can be stored in a contiguous order from the first storage device to the second storage device.

In some embodiments, the head server can be configured to determine a first subset length of the first subset of the second portion and a second subset length of the second subset of the second portion and increment the write pointer to the third write location based on the first subset length of the first subset of the second portion. The head server can be configured to assign write locations to each of the storage devices of the plurality of storage devices in a contiguous order. The head server can be configured to organize the first storage device and the second storage device in a contiguous track in the plurality of storage devices. The head server can be configured to determine storage sizes for each of the storage devices of the plurality of storage devices.

In some embodiments, the head server can be configured to determine the first storage device has a first storage size and the second storage device has a second storage size. The first storage size can be different from the second storage size. The head server can be configured to extract metadata from the first object and store the metadata corresponding to the first object to a storage media independent from the plurality storage devices. The head server can be configured to store the first write location corresponding to the first portion, the second write location corresponding to the first subset of the second portion, and the third write location corresponding to the second subset of the second portion to a storage media independent from the plurality storage devices. The head server can be configured to generate an encryption key for the first object, encrypt the first object with the encryption key, and record the encryption key with the first write location.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings:

FIGS. 6-6A are a flow diagram depicting an illustrative embodiment of a method for reading data sequentially on a media.

DETAILED DESCRIPTION

Following below are more detailed descriptions of various concepts related to, and implementations of, methods, apparatuses, devices, and systems for storing data. The various concepts introduced above and discussed in greater detail below may be implemented in any of numerous ways.

Figure 1:
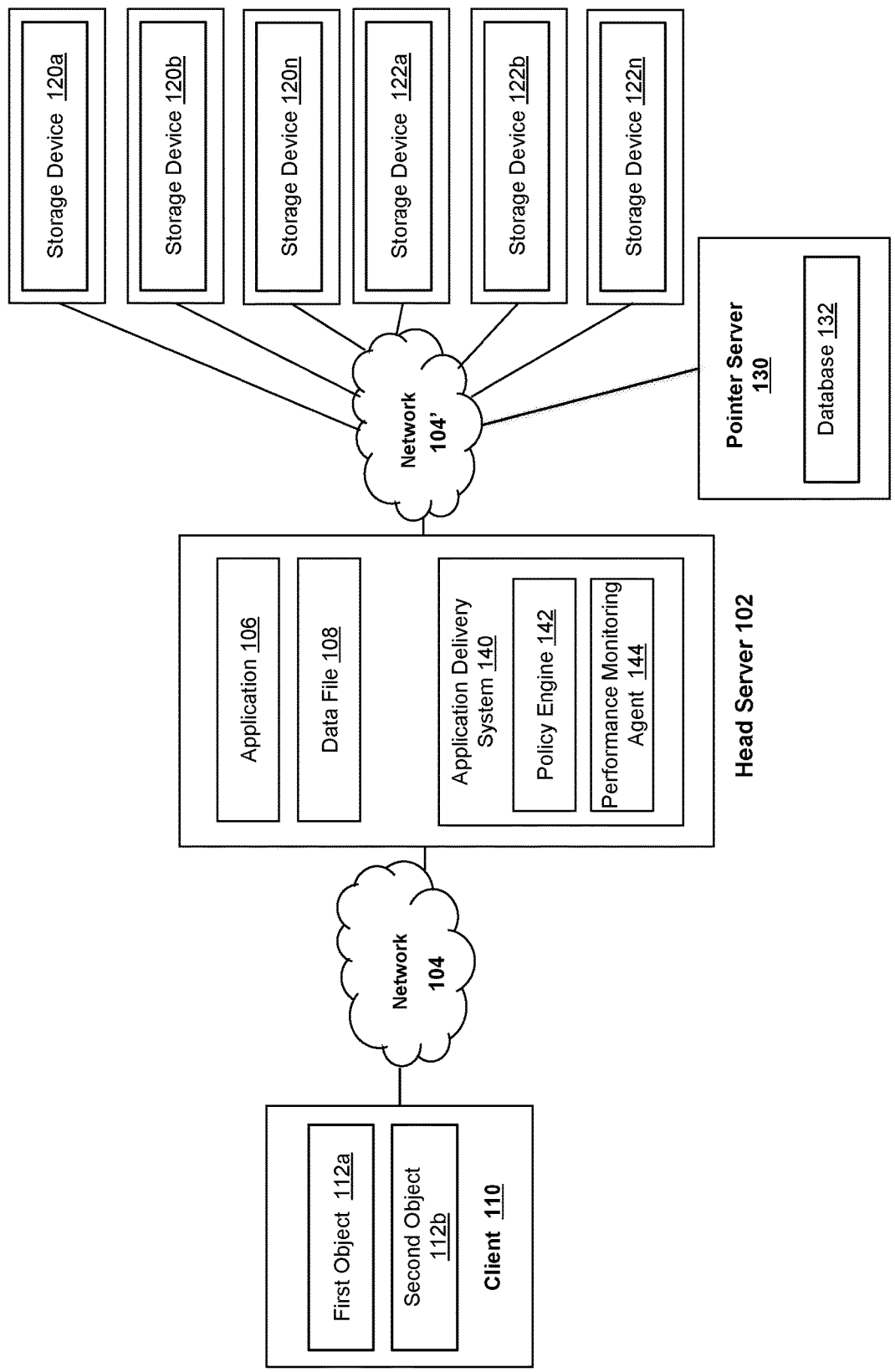
FIG. 1 depicts a block diagram of a network computing system, in accordance with an illustrative embodiment.

Referring now to FIG. 1, a client device 110 is in communication with a head server 102 through a first network 104 and the head server 102 is in communication with a first plurality of storage devices 120a-120n, a second plurality of storage devices 122a-122n, and a pointer server 130 through a second network 104'. For example, the client device 110 can be communicatively coupled with the head server 102 through first network 104 and the head server 102 can be communicatively coupled with the plurality of storage devices 120a-120n 122a-122n and the pointer server 130 through a second network 104'.

The head server 102 can include a database and a memory. The head server 102 can be implemented using hardware or a combination of software and hardware. For example, each component of the head server 102 can include logical circuitry (e.g., a central processing unit or CPU) that responses to and processes instructions fetched from a memory unit (e.g., memory). Each component of the head server 102 can include or use a microprocessor or a multi-core processor. A multi-core processor can include two or more processing units on a single computing component. Each component of the head server 102 can be based on any of these processors, or any other processor capable of operating as described herein. Each processor can utilize instruction level parallelism, thread level parallelism, different levels of cache, etc. For example, the head server 102 can include at least one logic device such as a computing device or server having at least one processor to communicate via a network 104, 104' with one or more clients 110 and/or one or more storage devices 120, 122. The components and elements of the head server 102 can be separate components or a single component. For example, the components of the head server 102 can include combinations of hardware and software, such as one or more processors configured to initiate stop commands, initiate motion commands, and transmit or receive timing data, for example. The head server 102 can include one or more processors. The one or more processors can include non-volatile memory that stores computer instructions and an operating system. For example, the computer instructions can be executed by the one or more processors out of volatile memory to perform all or part of the method 500 and/or method 600.

The client device 110 can transmit one or more objects 112 to head server 102 for storage. For example, the objects 112a, 112b can include a variable, a data structure, a disk, a file, a directory, or a function. The objects 112a, 112b can include multiple bytes (e.g., 8 bytes). Each of the objects 112a, 112b can include a checksum value, a length, and one or more status flags.

The objects 112a, 112b can correspond to data generated by client 110 or received by client 110 to be stored in at least one of the plurality of storage devices 120a-120n, 122a-122n. In the illustrative embodiment of FIG. 1, client device can generate a first object 112a and a second object 112b and transmit the first object 112a and the second object 112b to the head server 102.

In some embodiments, the client device 110 can include multiple client devices 110 (e.g., two or more). The head server 102 may include an application delivery system 140 for delivering a computing environment, application 106, and/or data files 108 to the client device 110. The head servers 102 can be configured to control the storage devices 120a-120n, 122a-122n and the pointer server 130. For example, the head server 102 can control transmitting of data, writing of data, reading of data, or extraction of data to and from the storage devices 120a-120n, 122a-122n and the pointer server 130.

The head server 102 can perform secondary responsibilities for the storage devices 120a-120n, 122a-122n in order to handle variations in throughput requirements, failover scenarios, and other benefits of redundancy. This arrangement allows for massive scaling of the systems and methods described herein. For example, a single deployment may have sixty storage devices 120a-120n, 122a-122n per primary head server 102 in a network of twelve hundred storage devices 120a-120n, 122a-122n.

The head server 102 can control and perform file management responsibilities for the storage devices 120a-120n, 122a-122n. For example, the head server 102 can write data to the storage devices 120a-120n, 122a-122n in a contiguous track and read back as a contiguous block. Thus, the head server 102 can identify a new block of data without skipping through a respective storage device 120. Further, a higher percentage of space on a respective one of the storage devices 120a-120n, 122a-122n can be utilized by writing data as a contiguous manner.

The application delivery management system 140 may deliver a computing environment to a user (e.g., client device 110), remote or otherwise, based on authentication and authorization policies applied by policy engine 142. A remote user may obtain a computing environment and access to server stored applications and data files from any network-connected device (e.g., client device 110).

For example, in response to a request from the client device 110, the application delivery system 140 may deliver the application 106 and data file 108 to the client device 110, for example via an application stream to operate in a computing environment on the client device 110, or via a remote-display protocol or otherwise via remote-based or server-based computing.

The policy engine 142 may control and manage the access to, and execution and delivery of, applications 106. For example, policy engine 142 may determine the one or more applications 106 the client device 110 may access and/or how the application 106 should be delivered to the client device 110, such as a server-based computing, streaming or delivering the application locally to the client device 110 for local execution.

The head server 102 includes a performance monitoring service or agent 144. In some embodiments, head server 102 can be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on the client device 110, storage devices 120a-120n, 122a-122n, or pointer server 130.

The performance monitoring agent 144 may monitor, measure, collect, and/or analyze data on a predetermined frequency, based upon an occurrence of given event(s), or in real time during operation of a network environment. The performance monitoring agent 144 may monitor resource consumption and/or performance of hardware, software, and/or communications resources of the client device 110, the storage devices 120a-120n, 122a-122n, or the pointer server 130. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored. The performance monitoring agent 144 may provide application performance management for application delivery system 140.

The storage devices 120a-120n, 122a-122n can include storage servers having one or more databases configured to store data, such as but not limited to data generated by or received at the client device 110. For example, the storage devices 120a-120n, 122a-122n can include non-volatile memory, such as but not limited to, non-volatile dual in-line memory (NVDIM) modules, or other forms of random-access memory. In some embodiments, the storage devices 120a-120n, 122a-122n can include high density magnetic disk drives. For example, the high-density magnetic disk drives can be selected to prioritize data retrieval requirements over data write requirements.

The head server 102 can control and perform file management responsibilities for the storage devices 120a-120n, 122a-122n. For example, the head server 102 can write data to the storage devices 120a-120n, 122a-122n in a contiguous track and read back as a contiguous block. Thus, the head server 102 can identify a new block of data without skipping through a respective storage device 120. Further, a higher percentage of space on a respective one of the storage devices 120a-120n, 122a-122n can be utilized by writing data as a contiguous manner. In some embodiments, data can be written to the storage devices 120a-120n, 122a-122n with disk media using shingled magnetic recording (SMR) disk drives, which compactly writes data to a disk track in a manner that writes to both the data-destination track and also the next adjacent track. The data can be written to the storage devices 120a-120n, 122a-122n with disk media using perpendicular magnetic recording (PMR) disk drives.

The head server 102 can be configured to control the storage devices 120a-120n, 122a-122n in a one-to-many ratio, where a single head server 102 may control dozens of storage devices 120a-120n, 122a-122n. For example, in some embodiments, a single head server 102 may control or be primarily responsible for a dozen to five dozen storage devices 120a-120n, 122a-122n (e.g., hard drive devices), which may each have multiple internal media platters.

The pointer server 130 can include a storage media independent from the storage devices 120a-120n, 122a-122n. For example, metadata corresponding to the first object 112a and the second object 112b can be extracted and stored in the pointer server 130. Thus, memory can be freed up on the storage devices 120a-120n, 122a-122n. In one embodiment, a higher percentage (e.g., 95% to 99%) of the space available on each of storage devices 120a-120n, 122a-122n can be utilized by storing the metadata at the pointer server 130 and separate from storage devices 120a-120n, 122a-122n.

The metadata can include, but not limited to, file name, object number or identifier, address (e.g., first block address), length (e.g., number of bytes or blocks), type, ownership or access-control data, associated time, encryption data, encryption keys, and date stamps (e.g., file creation time, last edit time, last access time, last back-up time, etc.), and various file attributes (e.g., whether the file is read-only and/or hidden). The head server 102 can control the storage of the metadata on the pointer server 130.

The pointer server 130 can include a database 132. The database 132 can include a structured query language (SQL) database having a plurality of entries organized into rows, columns, and tables. The database 132 can correspond to a directory containing memory locations and addresses for each of the portions of the objects 112a, 112b distributed by the head server 102 across the storage devices 120a-120n, 122a-122n. The head server 102 can use the database 132 to identify the different portions of the objects 112a, 112b. The database 132 can store metadata for the first object 112a and the second object 112b to provide more storage space or capacity on the respective storage devices 120a-120n, 122a-122n. The pointer server 130 and the database 132 can be remotely located with respect to the head server 102 and the storage devices 120a-120n, 122a-122n.

The first network 104 and the second network 104' can include a Local Area Network (LAN), Wide Area Network (WAN) or the Internet. The first network 104 and the second network 104' can correspond to the same network or to different networks. For example, the embodiment shown in FIG. 1 shows the first network 104 and the second network 104' between the client device 110, head server 102, pointer server 130 and storages devices 120a-120n, 122a-122n however, in other embodiments, the client device 110, head server 102, pointer server 130 and storages devices 120a-120n, 122a-122n may be on the same network 104. The first and second networks 104, 104' may be the same type of network or different types of networks. In some embodiments, first network 104 may be a private network such as a local area network (LAN) or a company Intranet, while second network 104' may be a public network, such as a wide area network (WAN) or the Internet. In other embodiments, both the first network 104 and the second network 104' may be private networks. The first network 104 and the second networks 104' may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

Figure 2:
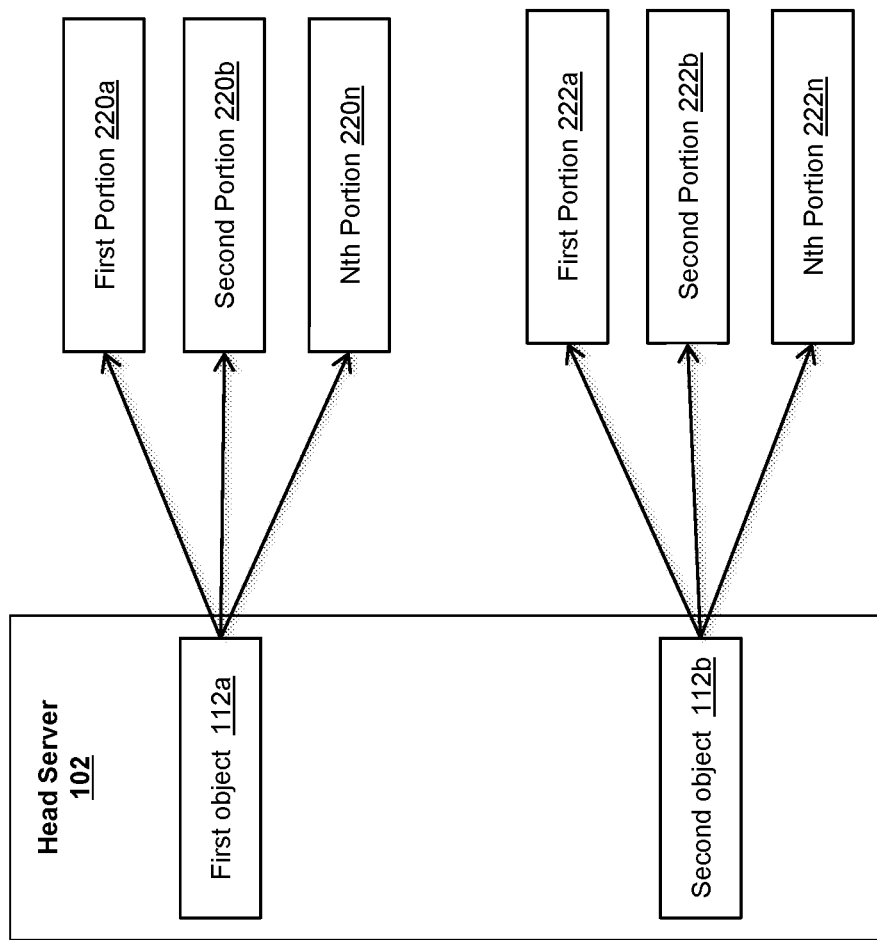
FIG. 2 depicts a block diagram of an illustrative embodiment of a head server portioning multiple objects.

Referring now to FIG. 2, the head server 102 can receive the first object 112a and the second object 112b and partition or divide them into multiple portions (also referred to herein as slices). For example, and as illustrated in FIG. 2, the head server 102 can partition or divide the first object 112a and the second object 112b into a plurality of first portions 220a-220n and a plurality of second portions 222a-222n, respectively. The first portions 220a-220n and the second portions 222a-222n can correspond to slices or shares of the first object 112a and the second object 112b, respectively.

For example, the head server 102 can partition or divide the first object 112a into a plurality of first portions 220a-220n. The first portions 220a-220n can be formed having a first length or predetermined length. The number of portions and the length of each of the first portions 220a-220n can be selected based at least in part on a size or length of the first object 112a.

The head server 102 can partition or divide the second object 112b into a plurality of second portions 222a-222n. The second portions 222a-222n can be formed having a second length or predetermined length. The number of portions and the length of each of the second portions 222a-222n can be selected based at least in part on a size or length of the second object 112b.

The first length of the first portions 220a-220n can be different (e.g., greater than, less than) the second length of the second portions 222a-222n or the first length of the first portions 220a-220n can be the same as the second length of the second portions 222a-222n.

Each of the first portions 220a-220n and the second portions 222a-222n can include header information and metadata corresponding to the respective object 112a, 112b. In some embodiments, each of the first portions 220a-220n and the second portions 222a-222n can include an object identifier corresponding to the object they originated from and a slice identifier indicating their respective position or order with respect to the other portions from the same object (e.g., slice 2 of 20 slices from first object 112a).

Figure 3:
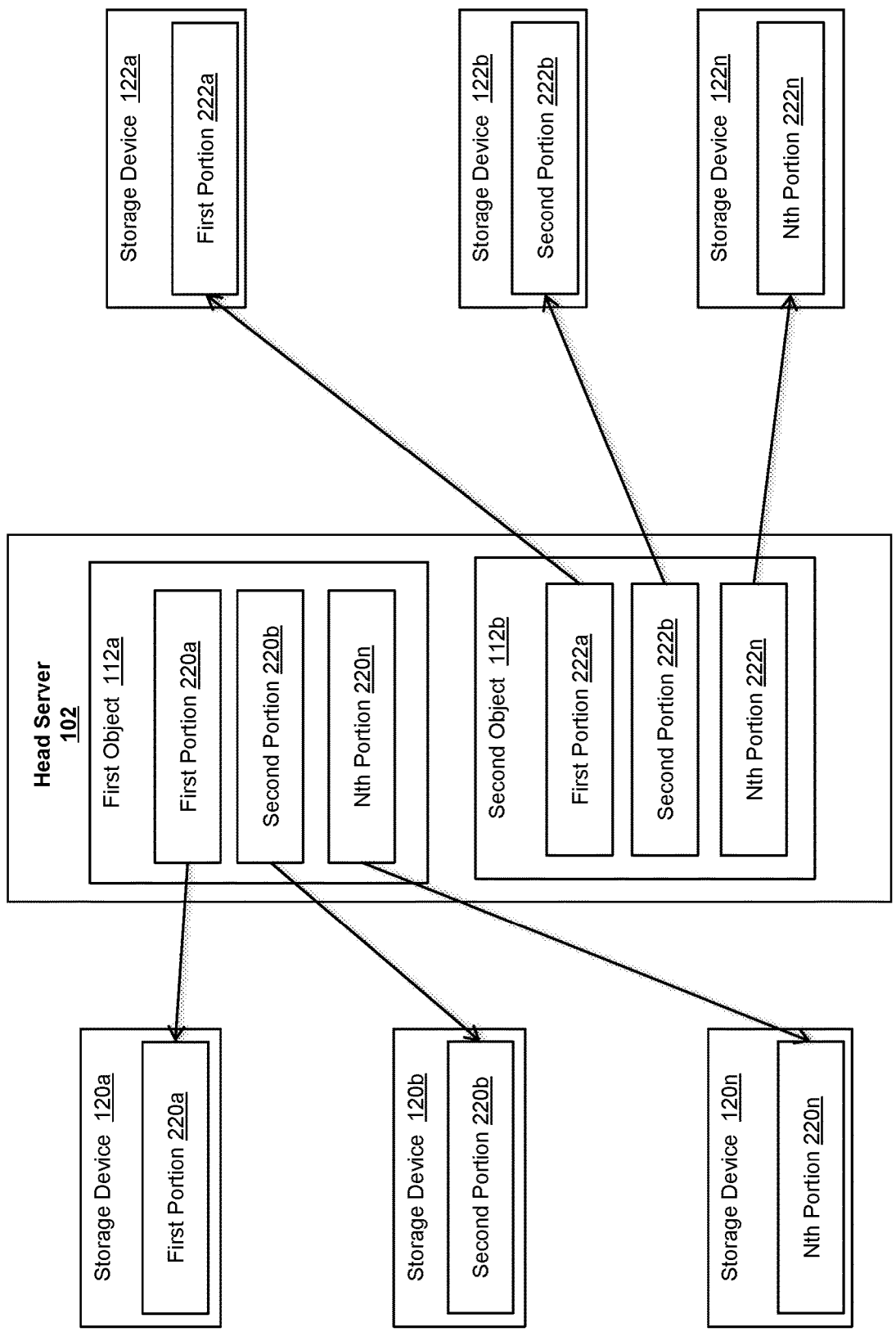
FIG. 3 depicts a block diagram of an illustrative embodiment of a head server transmitting the portions of multiple objects to a plurality of storage devices.

Referring now to FIG. 3, the head server 102 can transmit the first portions 220a-220n and the second portions 222a-222n to the first plurality of storage devices 120a-120n (e.g., first subset of the plurality of storage devices) and transmit the second portions 222a-222n to the second plurality of storage devices 122a-122n (e.g., second subset of the plurality of storage devices).

The head server 102 can spread or transmit the first portions 220a-220n and the second portions 222a-222n over multiple storage devices 120a-120n, 122a-122n. For example, in some embodiments, the head server 102 can spread or transmit the first portions 220a-220n and the second portions 222a-222n over 20 storage devices 120a-120n, 122a-122n with 16 of the storage devices 120a-120n, 122a-122n receiving data and 4 of the storage devices 120a-120n, 122a-122n receiving redundant data. In one embodiment, the storage devices 120a-120n, 122a-122n can be grouped together in groups of 20 storage devices and be referred to as pods.

Thus, the first object 112a can have its respective first portions 220a-220n spread across multiple storage devices 120a-120n, 122a-122n and the second object 112b can have its respective second portions 222a-222n spread across multiple storage devices 120a-120n, 122a-122n.

The head server 102 may select the storage devices to transmit the first portions 220a-220n and second portions 222a-222n randomly. For example, the head server 102 can randomly assign the first portions 220a-220n to the first plurality of storage devices 120a-120n using a first hash calculation or the second plurality of storage devices 122a-122n, randomly using a second hash calculation. In one embodiment, the head server 102 may assign a first portion 220a to a third storage device 120c and a second portion 220b to a first storage device 120a. The head server 102 can randomly assign the second portions 222a-222n to the second plurality of storage devices 122a-122n or the first plurality of storage devices 120a-120n randomly, such as but not limited to assigning a third portion 222c to a first storage device 122a and a second portion 222b to a fourth storage device 122d.

The first storage devices 120a-120n can write the first portions 220a-220n to a plurality of write locations on the respective storage device. For example, a first portion 220a can be written to a first write location of a first storage device 120a. The first storage device 120a can use a first pointer to identify or select the first write location for the first portion 220a. In some embodiments, the first write location can be the same for first plurality of storage devices 120a-120n. In some embodiments, portions 220a-220n, 222a-222n from multiple objects 112a, 112b can be transmitted to a single or common storage device 120a-120n, 122a-122n. For example, a first storage device 120a can receive a first portion 220a of the first object 112a and a first portion 222a of the second object 112b. In some embodiments, the write locations can correspond to read locations. For example, the location of a storage device 120, 122 can be referred to as a write location during a writing operation or writing of portions 220 of an object 112 to a storage device 120, 122. The location of a storage device 120, 122 can be referred to as a read location during a reading operation or reading of portions 220 of an object 112 from a storage device 120, 122. Thus, a write location can correspond to or be the same as a read location. For example, a first write location can correspond to or be the same as a first read location.

Figure 4:
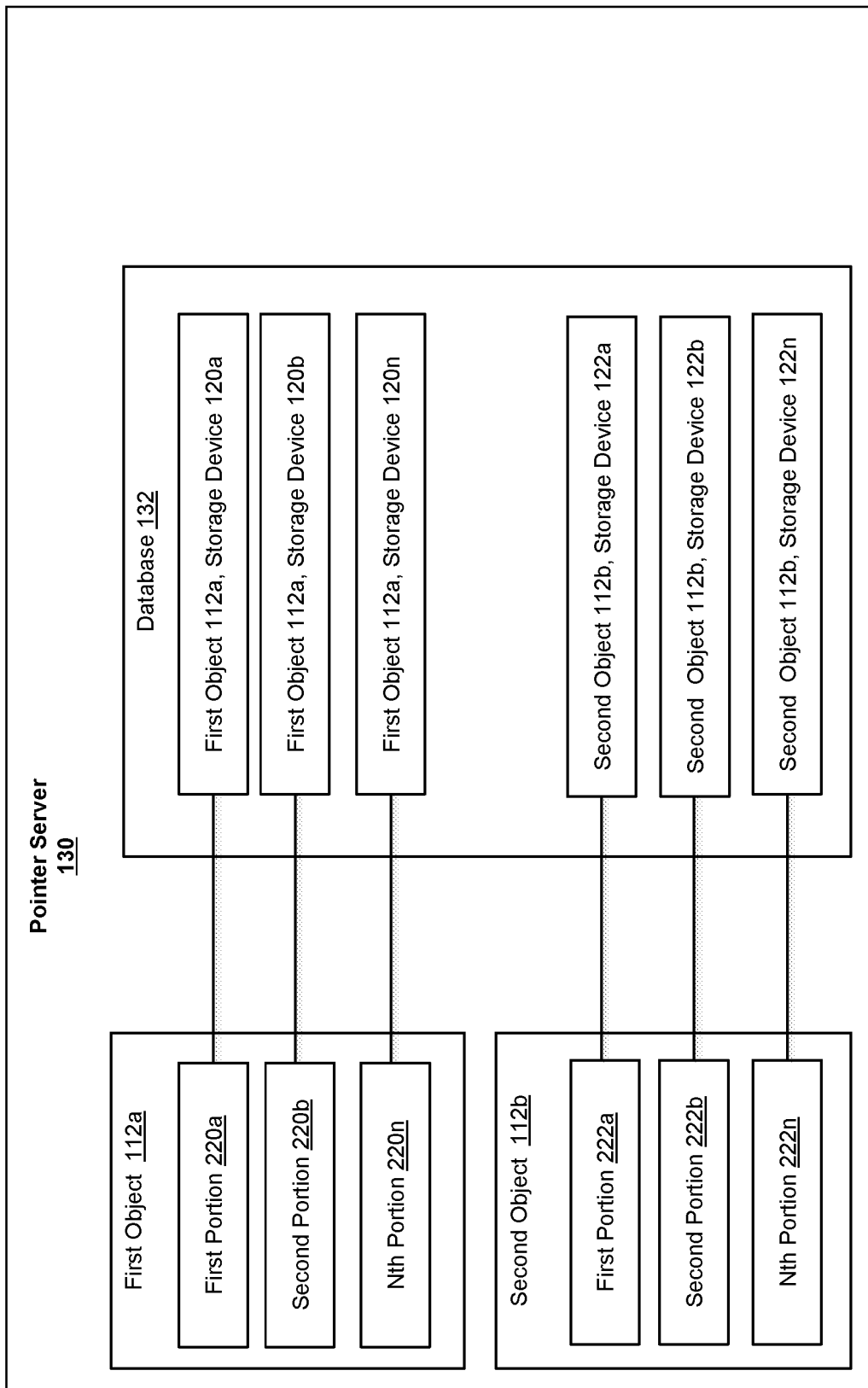
FIG. 4 depicts a block diagram of an illustrative embodiment of a server writing portions of multiple object to write locations of a data storage device.

Referring now to FIG. 4, metadata corresponding to the first portions 220a-220n of the first object 112a and the second portions of the second object 112b can be stored in the database 132 of the pointer server 130. The database 132 can include a structured query language (SQL) database having a plurality of entries organized into rows, columns, and tables. The metadata for the first object 112a and the second object 112b can be stored in the pointer server 130 to provide more storage space or capacity on the respective storage devices 120a-120n, 122a-122n. For example, the metadata for the first object 112a and the second object 112b can be extracted or moved from respective ones of the storage devices 120a-120n, 122a-122n to the database 132 of the pointer server 130 that is remotely located with respect to the storage devices 120a-120n, 122a-122n.

The metadata can include data corresponding to each of the first portions 220a-220n of the first object 112a and the second portions 222a-222n of the second object 112b. For example, the metadata may include, but not limited to, a key (e.g., name), an object number, a checksum value, a content length or portion length value, an encryption data, an encryption key, a storage device address r storage server address, and a pointer to the storage device or storage server address.

As depicted in FIG. 4, a first entry 402 of database 132 can include data corresponding to a first portion 220a of the first object 112a. In particular, the first entry 402 includes which object the respective portion originated, here the first object 112a and the first storage device the first portion is stored in, here the first storage device 120a.

A second entry 404 includes data corresponding to a second portion 220b of the first object 112a. The second entry 404 includes which object the respective portion originated, here the first object 112a and the storage device the second portion is stored in, here the second storage device 120b. A third entry 406 includes data corresponding to an Nth portion 220n of the first object 112a. The third entry 406 includes which object the respective portion originated, here the first object 112a and the storage device the second portion is stored in, here the Nth storage device 120n.

A fourth entry 408 of database 132 includes data corresponding to a first portion 222a of the second object 112b. In particular, the fourth entry 408 includes which object the respective portion originated, here the second object 112b and the storage device the first portion is stored in, here the first storage device 122a of the second plurality of storage devices 122a-122n. A fifth entry 410 includes data corresponding to a second portion 222b of the second object 112b. The fifth entry 410 includes which object the respective portion originated, here the second object 112b and the storage device the second portion is stored in, here the second storage device 122b. A sixth entry 412 includes data corresponding to a Nth portion 222n of the second object 112b. The sixth entry 412 includes which object the respective portion originated, here the second object 112b and the storage device the second portion is stored in, here the Nth storage device 122n.

The database 132 can formed or generated having any number of entries. The number of entries or tables in database 132 can be selected to correspond to the number of objects 112 and portions of the objects.

Figure 5:
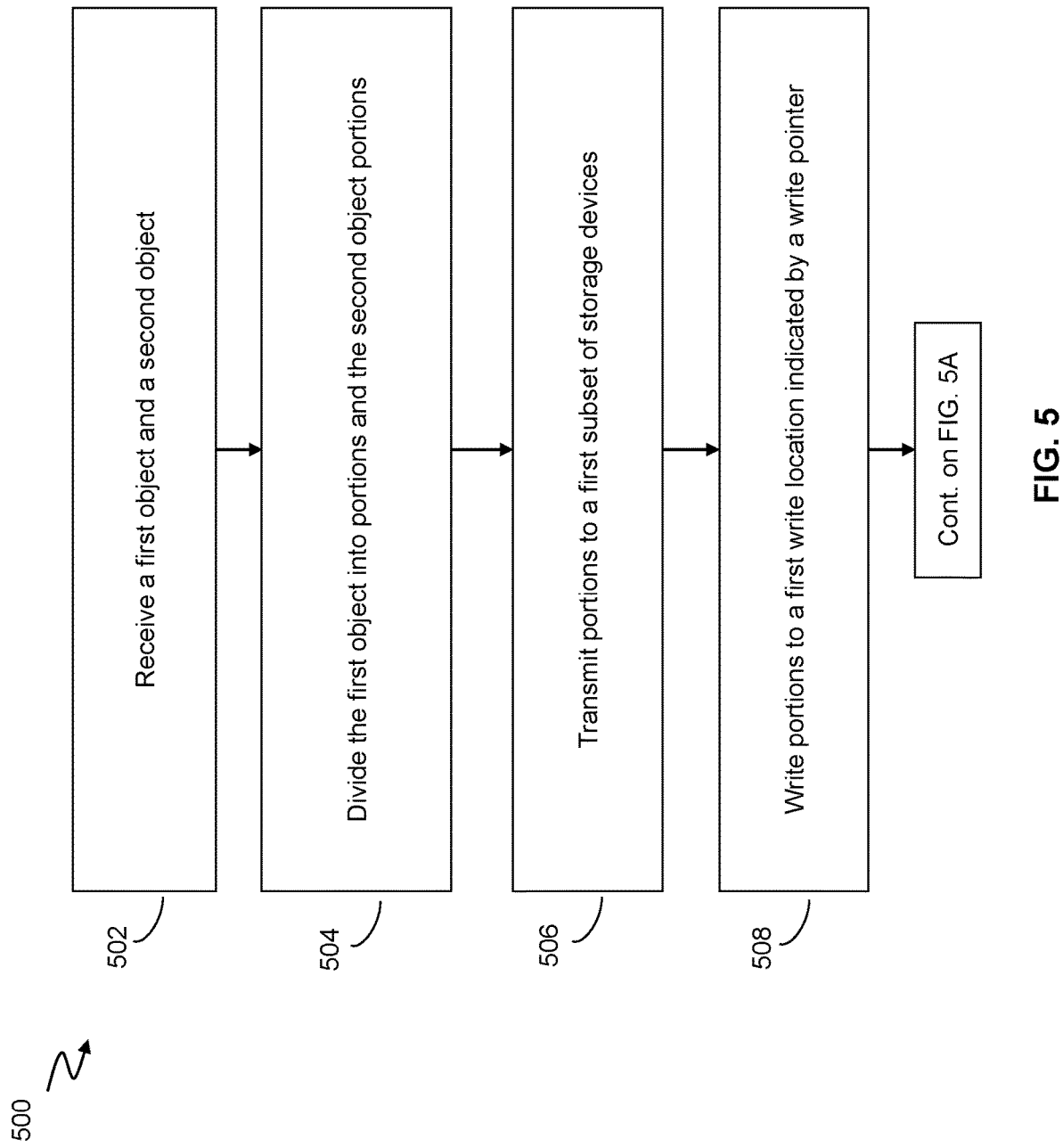
FIGS. 5-5A are a flow diagram depicting an illustrative embodiment of a method for storing data sequentially on a media.
Figure 5A:
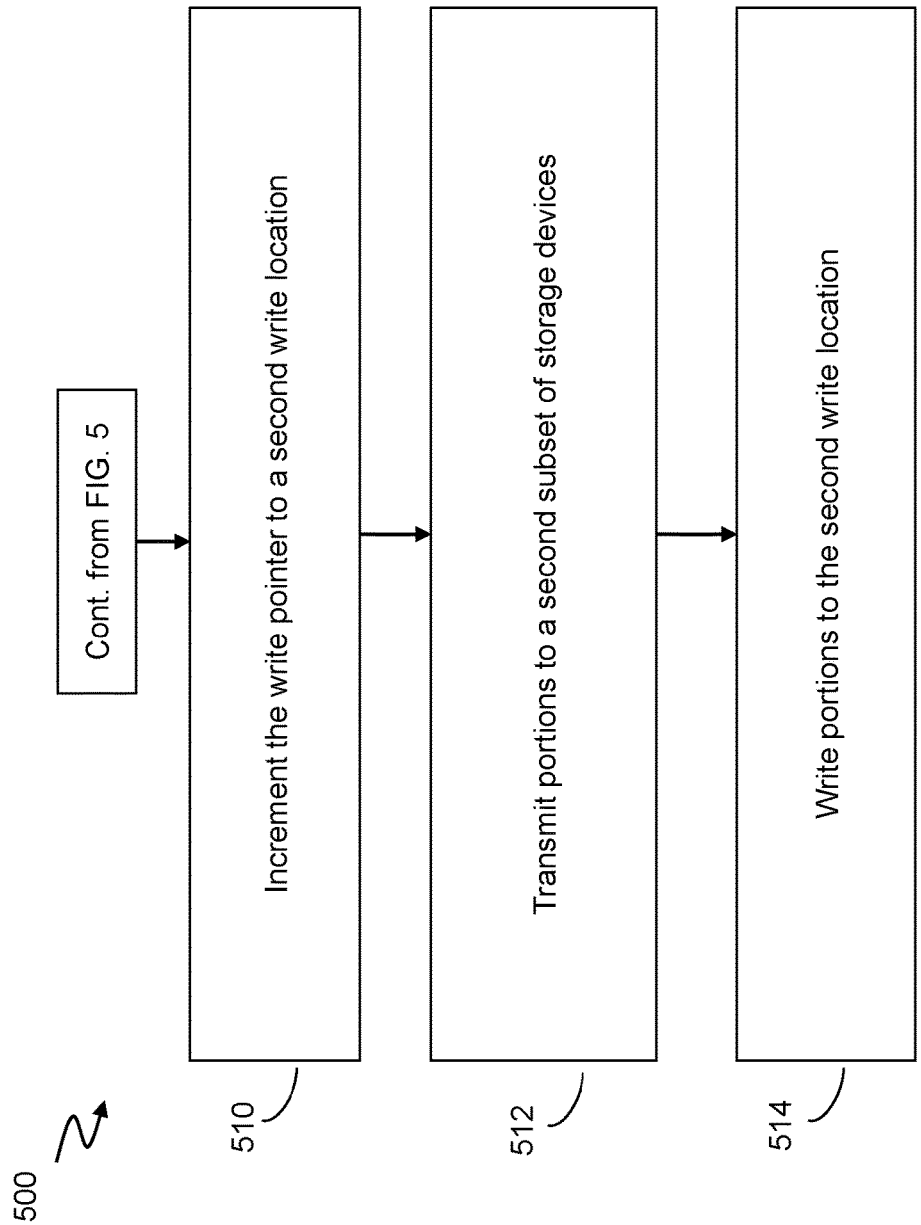

Referring now to FIGS. 5-5A, a method 500 for storing data sequentially on a media begins at block 502, by receiving, by a head server 102 in communication with a plurality of storage devices 120, 122, a first object 112a and a second object 112b. The first object 112a and the second object 112b can include data or a data structure generated by the client device 110. The client device 110 can transmit the first object 112a and the second object 112b to the head server 102 to be stored. For example, the first object 112a and the second object 112b can be received as part of an erasure coding technique. The first object 112a and second object 112b can correspond to data segmented or broken into multiple fragments or objects to be stored across different locations or storage media. The number of fragments or objects can be selected to provide redundancy of an original data stream.

The storage devices 120, 122 can include storage servers having one or more databases (e.g., SQL databases). The storage devices 120, 122 can be remotely located from the client device 110 and the head server 102. For example, the storage devices 120, 122 can execute on a third party device or remote device, remotely located from the client device 110 and the head server 102.

At block 504, the head server 102 can divide or partition the first object 112a into a first plurality of portions 220 and the second object 112b into a second plurality of portions 220. The number of portions 220 for the first plurality of portions 220 or the second plurality of portions 220 can vary and can be selected based in part on a size or length of the first object 112a or the second object 112b, respectively. Each of the first plurality of portions 220 can have a first length and each of the second plurality of portions 220 can have a second length. Each of the first plurality of portions 220 can have the same length and each of the second plurality of portions 220 can have the same length. The first length can be different from the second length or the first length can be the same as the second length. In some embodiments, the head server 102 can divide the first object 112a into a first portion 220 having a first length and a second portion 220 having a second length. The first length can be different from the second length. In embodiments, the first length can be the same as the second length. In some embodiments, the head server 102 can divide the second object 112b into a first portion 220 having a first length and a second portion 220 having a second length. The first length can be different from the second length. In some embodiments, the first length can be the same as the second length.

At block 506, the head server 102 can transmit each of the first plurality of portions 220 to a respective one of the first subset of the plurality of storage devices 120, 122. The storage devices 120, 122 can be grouped together into a first subset of storage devices 120, 122 (e.g., two or more storage devices) and a second subset of storage devices 120, 122. In some embodiments, the storage devices 120, 122 can be grouped together in groups of 20, forming a pod. In some embodiments, the head server 102 can divide the first object 112a into a first portion 220 having a first length and a second portion 220 having a second length. The first length can be different from the second length. In embodiments, the first length can be the same as the second length. In some embodiments, the head server 102 can divide the second object 112b into a first portion 220 having a first length and a second portion 220 having a second length. The first length can be different from the second length. In some embodiments, the first length can be the same as the second length.

The head server 102 can select a first subset of storage devices 120, 122 from the plurality of storage devices 120, 122 to store the first plurality of portions 220 of the first object 112a on. The head server 102 can spread or distribute the first plurality of portions 220 across multiple storage devices 120, 122. The number of storage devices 120, 122 in each subset can correspond to the number of portions 220 to be stored. For example, in an embodiment having 20 portions (e.g., 20 disks), the 20 portions can be spread across 20 different storage devices 120, 122 such that each portion is stored on a different storage device 120, 122. Thus, the systems and methods as described herein can be scaled at least in part based on an amount of data to be stored.

The head server 102 can select the storage devices 120, 122 using various techniques. For example, the storage devices 120, 122 can be ordered or numbered such that the head server 120 selects the storage devices 120, 122 sequentially. The head server 102 can select the storage devices 120, 122 based on an amount of data already stored on a respective one of the storage devices 120, 122. For example, the head server 102 can select a storage device 120, 122 having the least data stored thereon and thus, having the greatest amount of available space for new data. The head server 102 may perform traffic calculations or network traffic measurements to identify storage devices 120, 122 having the greatest amount of available space for new data. In some embodiments, the head server 102 can randomly select the first subset of storage devices 120, 122 from the plurality of storage devices 120, 122. For example, the head server 102 can randomly assign the first plurality of portions to the first subset of the plurality of storage devices using hash calculations.

At block 508, each of a first subset of the plurality of storage devices 120, 122 can write a respective one of the first plurality of portions 220 to a first write location indicated by a write pointer. The first plurality of portions 220 can be written in as contiguous data. For example, in some embodiments, the first plurality of portions 220 can be written not in fixed sizes (e.g., fixed 4K bytes). In some embodiments, the first plurality of portions 220 can be written in sequential order. The sequential order can correspond to an order of the portions 220 with respect to each other within the original first object 112*a*. Thus, when the first plurality of portions 220 are read from the first subset of the plurality of storage devices 120, 122, the first plurality of portions 220 can be read in sequential order.

The first write location can be the same for each of the first subset of the plurality of storage devices 120, 122. Each of the storage devices 120, 122 in the first subset can receive at least one portion 220 of the first object 112*a*. The storage devices 120, 122 can identify a first write location in their respective memory using a write pointer. The write pointer can indicate a location or storage address in memory on each of the respective storage devices 120, 122 in the first subset to store the respective portions 220 of the first object 112*a*. Thus, each of the storage devices 120, 122 in the first subset can write the portion of the first object 112*a* they received to a similar location in their respective memory.

The first write location can be selected based on a location a previous entry in the memory that data was written. For example, the storage devices 120, 122 can write data in a contiguous sequence in their respective memory. Thus, the write pointer can indicate a next available location to write data in the memory of each of the first subsets of storage devices 120, 122.

At block 510, the head server 102 can increment the write pointer to a second write location based on the first length. The head server 102 can use the first length of each of the portions 220 of the first object 112*a* to identify the second write location. The first length can be used to identify the last location or storage address, here the portion of the first object 112*a*, that data was written. The head server 102 can increment the write pointer to the second location based on the first length so that the storage devices 120, 122 can write data in a contiguous sequence in their respective memory.

At block 512, the head server 102 can transmit each of the second plurality of portions 220 to a respective one of the second subset of the plurality of storage devices 120, 122. The head server 102 can select a second subset of storage devices 120, 122 from the plurality of storage devices 120, 122 based on the storage devices 120, 122 not included in the first subset. For example, the second subset of the plurality of storage devices 120, 122 can be different than the first subset of the plurality of storage devices 120, 122. The second subset can include two or more storage devices 120, 122.

The head server 102 can spread or distribute the second plurality of portions 220 across multiple storage devices 120, 122 in the second subset. The number of storage devices 120, 122 in the second subset can correspond to the number of portions 220 to be stored. The head server 102 can select the storage devices 120, 122 for the second subset using various techniques. For example, the storage devices 120, 122 can be ordered or numbered such that the head server 102 selects the storage devices 120, 122 sequentially. The head server 102 can select the storage devices 120, 122 based on an amount of data already stored on a respective one of the storage devices 120, 122. For example, the head server 102 can select a storage device 120, 122 having the least data stored thereon and thus, having the greatest amount of available space for new data. The head server 102 may perform traffic calculations or network traffic measurements to identify storage devices 120, 122 having the greatest amount of available space for new data. In some embodiments, the head server 102 can randomly select the second subset of storage devices 120, 122 from the plurality of storage devices 120, 122. For example, the head server 102 can randomly assign the second plurality of portions 220 to the second subset of the plurality of storage devices 120, 122 using a hash calculation.

At block 514, each of a second subset of the plurality of storage devices 120, 122 can write a respective one of the second plurality of portions 220 to the second write location of the data storage device 120, 122. The second plurality of portions 220 can be written in as contiguous data. For example, in some embodiments, the second plurality of portions 220 can be written not in fixed sizes (e.g., fixed 4K bytes). In some embodiments, the second plurality of portions 220 can be written in sequential order. The sequential order can correspond to an order of the portions 220 with respect to each other within the original second object 112*b*. Thus, when the second plurality of portions 220 read from the second subset of the plurality of storage devices 120, 122, the second plurality of portions 220 can be read in sequential order.

The second write location can be the same for each of the second subset of the plurality of storage devices 120, 122. The second write location can be selected based at least on the first write location. For example, the second write location can be spaced from the first write location a number of storage addresses corresponding to the first length. Each of the storage devices 120, 122 in the second subset can receive at least one portion of the second object 112*b*. The storage devices 120, 122 can identify the second write location in their respective memory using the second write pointer. The second write pointer can indicate a location or storage address in memory on each of the respective storage devices 120, 122 in the second subset to store the respective portions of the second object 112*b*. In some embodiments, each of the storage devices 120, 122 in the second subset can write the portion of the second object 112*b* they received to a similar location in their respective memory. The head server 102 can store the first write location corresponding to the first plurality of portions 220 and the second write location corresponding to the second plurality of portions 220 to a storage media independent from the plurality storage devices 120, 122. For example, the head server 102 can store the first write location and the second write location in a pointer server 130 that is independent from the first subset and the second subset of storage devices 120, 122.

The pointer server 130 can include a database, such as but not limited to a SQL database. The database can correspond to a directory for the head server 102 and include memory address or locations for each of the portions 220 of the first object 112*a* and the second object 112*b* distributed across the first subset of the plurality of storage devices 120, 122 and the second subset of the plurality of storage devices 120, 122. The head server 102 can use the database to identify a location or address of portions of the first object 112*a* or the second object 112*b*, for example, to read the respective portions from the storage devices 120, 122.

The head server 102 can store metadata corresponding to the first portions 220 of the first object 112*a* and the second portions 220 of the second object 112*b* in the database of the pointer server 130. The head server 102 may extract the metadata from the storage devices 120, 122 or the head server 102 can store the metadata prior to transmitting the portions of the first object 112a and the second object 112b to the first subset of storage devices 120, 122 and the second subset of storage devices 120, 122, respectively. The metadata may include, but not limited to, a key (e.g., name), an object number, a checksum value, a content length or portion length value, an encryption data, an encryption key, a storage device or storage server address, and a pointer to the storage device or storage server address.

The portions 220 of the first object 112a and the portions 220 of the second object 112b can be written with shingled magnetic recording. For example, the portions 220 (or track, disk) can be written such that adjacent tracks are partially overlapped. The head server 102 or the respective storage devices 120, 122 can write a shingled track such that the shingled track overwrites a portion of a previously written track that is immediately adjacent to it and arranging the tracks in a specific or predetermined order. For example, portions 220 of the first object 112a and the second object 112b can be written with disk media using shingled magnetic recording (SMR) disk drives. The width of a track, which is the portion of the written track that retains the magnetization of the original signal after the following adjacent track is written, can be less than the original track by a predetermined amount or percentage. Each of the portions 220 can be written as shingled tracks such that each portion 220 is reduced by the same predetermined amount or percentage. The predetermined amount or percentage can be selected abased in part on the properties of the storage devices 120, 122 or an amount of data to be stored.

The portions 220 of the first object 112a and the portions 220 of the second object 112b can be written in sequential order. The sequential order can correspond to the order of the portions 220 with respect to each in the object they originated from. For example, in an embodiment in which the first object 112a included a first portion 220, a second portion 220, and a third portion 220. The first portion 220 can be written to a first storage device 120, 122, the second portion 220 can be written to a second storage device 120, 122 and the third portion 220 can be written to a third storage device 120, 122. Thus, the original order of the portions 220 can be maintained as the portions 220 are distributed across multiple storage devices 120, 122. In some embodiments, the portions 220 of the first object 112a and the portions 220 of the second object 112b can be written as contiguous data and read as a contiguous block.

The head server 102 can write an indication of the first length to a header of the first plurality of portions 220 and an indication of the second length to a head of the second plurality of portions 220. For example, the first object 112a and the second object 112b can be divided into the first plurality of portions 220 and the second plurality of portions 220. The portions 220 can be referred to herein as slices of the respective object 112 and each slice can include header portion and a metadata portion. The header portion can include data corresponding to a length (e.g., first length, second length, etc.) of the respective portion 220. The metadata portion can include data corresponding to the respective object 112 the slice originated from and a location or address (e.g., write location, read location) of the respective storage device 120, 122 the portion is stored on.

In some embodiments, the head server can duplicate the one of the first plurality of portions 220 of the first object 112a or one of the second plurality of portions 220 of the second object 112b. The head server 102 can duplicate the one of the first plurality of portions 220 of the first object 112a on a storage device not included in the first subset of storage devices 120, 122. The head server 102 can duplicate the one of the second plurality of portions 220 of the second object 112b on a storage device 120, 122 not included in the second subset of storage devices 120, 122. Thus, a copy or duplication of the portions 220 of the first object 112a and the second object 112b can be generated and stored on different storage devices 120, 122 from an original version of the portions 220 of the first object 112a and the second object 112b.

Encryption keys can be generated for the first object 112a and the second object 112b. The head server 102 can generate a first encryption key for the first object 102a and a second encryption key for the second object 112b. The head server 102 can encrypt the first object 112a with the first encryption key and encrypt the second object 112b with the second encryption key. The head server 102 can record the first encryption key with the first write address (and first read location) and record the second encryption key with the second write address (and second read location). In some embodiments, the first encryption key and the second encryption key can be stored in the database 132 of the pointer server 130. For example, the head server 102 can include the encryption data in the metadata for each of the portions 220 of the first object 112a and the second object 112b stored in the database 132 of the pointer server 130. In some embodiments, each of the portions 220 of the first object 112a and each of the portions 220 of the second object 112b can be encrypted. In other embodiments, subsets of portions 220 of the first object 112a or subsets of the portions 220 of the second object 112b can be encrypted.

The head server 102 can generate the first encryption key or the second encryption key or both the first and second encryption keys with an account-specific encryption key prior to recording the respective encryption key with the first write address or the second write address (and/or first and second read location). For example, each account can have unique encryption data that can be used to generate different encryption keys for each account. In some embodiments, the head server 102 can generate the unique encryption data. In other embodiments, a user of the client device 110 or the respective account can provide unique encryption data.

The head server 102 can store portions of the different objects 112 in a common block. For example, at least one of the plurality of storage devices 120, 122 can write one of the plurality of the first portions 220 to a first block stored on a temporary storage medium and write one of the plurality of the second portions 220 to the first block stored on the temporary storage medium. The first block can include a portion 220 from the first object 112a and a portion of the second object 112b. The first block can be stored on the temporary storage medium that is independent of the head server 102 and the plurality of storage devices 120, 122. The temporary storage medium can include or be executing on a remote server, remotely located from the head server and the plurality of storage devices. The respective storage device 120, 122 can write the first block to a long-term storage medium. In some embodiments, the long-term storage medium can include the pointer server 130 having the database 132.

In some embodiments, the head server 102 can divide the first object 112a into a first portion 220 having a first length and a second portion 220 having a second length. The first length can be different from the second length. In embodiments, the first length can be the same as the second length. In some embodiments, the head server 102 can divide the second object 112b into a first portion 220 having a first length and a second portion 220 having a second length. The first length can be different from the second length. In some embodiments, the first length can be the same as the second length. The head server 102 can transmit a first portion 220 of the first object 112a to a first storage device 120a of the plurality of storage devices 120, 122. The first storage device 120a can write the first portion 220 to a first write location of the first storage device 120a indicated by a write pointer. In some embodiments, the head server 102 can determine a write location, such as but not limited to, the first write location, using a hash calculation (e.g., first hash calculation).

The head server 102 can increment the write pointer to a second write location based on the first length of the first portion 220 of the first object 112a. For example, the head server 102 can determine a next available or next write location to transmit and write the portions 220 of the second object 112b. The second write location can correspond to a write location of the first storage device 112a. In embodiments, the head server 102 can determine the first length of the of the first portion 220 of the first object 112a. The head server 102 can increment or move the first write location to the second write location based on the first length of the first portion 220 of the first object 112a.

In some embodiments, the head server 102 can store subsets of the second portion 220 of the first object 112a at different storage devices 120, 122 or across different storage devices 120, 122. For example, the head server 102 can transmit a first subset of the second portion 220 of the first object 112a to the first storage device 120a and a second subset of the second portion 220 of the first object 112a to a second storage device 120b of the plurality of storage devices 120, 122. The head server 102 can store subsets of the second portion 220 of the first object 112a at different storage devices 120, 122 responsive to determining the first storage device 112a has reached a capacity limit, memory limit or memory threshold.

The first storage device 112a can write the first subset of the second portion 220 to the second write location of the first storage device 120a. The second write location can be in a contiguous order indicated by a write pointer and as compared the first write location. For example, the first write location and the second write location can be in a contiguous order with respect to each other.

The head server 102 can increment the write pointer to a third write location of the second storage device 120b. For example, the head server 102 can determine a next available or next write location to transmit and write the remaining portions 220 of the second object 112b. The head server 102 can determine the determine a next available or next write location based in part on a length of the first subset pf the second portion of the second object 112b. In embodiments, the head server 102 can determine a first subset length of the first subset of the second portion 220 and a second subset length of the second subset of the second portion 220. The first subset length of the first subset of the second portion 220 can be the same as the second subset length of the second subset of the second portion 220. The first subset length of the first subset of the second portion 220 can be different from the second subset length of the second subset of the second portion 220. The head server 102 can increment or move the write pointer to the third write location based on the first subset length of the first subset of the second portion 220.

The second storage device 120b can write the second subset of the second portion 220 to the third write location of the second storage device 120b. The first portion 220 and the second portion 220 can be stored in a contiguous order from the first storage device 120a to the second storage device 120b. For example, the head server 102 can assign write locations to each of the storage devices 120, 122 of the plurality of storage devices 120, 122 in a contiguous order. In some embodiments, the head server 102 can organize the first storage device 120a and the second storage device 120b in a contiguous track in the plurality of storage devices 120, 122. In embodiments, the head server 102 can write the first portion 220 and the second portion 220 with disk media using shingled magnetic recording (SMR) disk drives.

In some embodiments, the head server 102 can determine storage sizes, memory capacities or memory limits for each of the storage devices 120, 122 of the plurality of storage devices 120, 122. The head server can use the storage sizes to determine a number of write locations and/or how to store objects 112 across the storage devices 120, 122. For example, the head server 102 can determine that the first storage device 120a has a first storage size and the second storage device 120b has a second storage size. The first storage size can be different from the second storage size. In some embodiments, the first storage size can be the same as the second storage size. The head server 102 can assign write locations responsive to determine the storage seizes of one or more storage devices 120, 122 of the plurality of storage devices 120, 122.

In some embodiments, the head server 102 can extract or identify metadata from the first object 112a. The head server 102 can extract or identify metadata from the first portion 220 of the first object 112a and/or the second portion 220 of the second object 112b. The head server 102 can store the metadata corresponding to the first object 112a to a storage media independent from the plurality storage devices 120, 122. For example, in some embodiments, the head server 102 can store the metadata corresponding to the first object 112a to a database 132 of a pointer server 130. The head server 102 can store the first write location corresponding to the first portion 220, the second write location corresponding to the first subset of the second portion 220, and the third write location corresponding to the second subset of the second portion 220 to a storage media independent from the plurality storage devices. For example, in some embodiments, the head server 102 can store the first write location corresponding to the first portion 220, the second write location corresponding to the first subset of the second portion 220, and the third write location corresponding to the second subset of the second portion 220 to a database 132 of a pointer server 130.

Figure 6A:
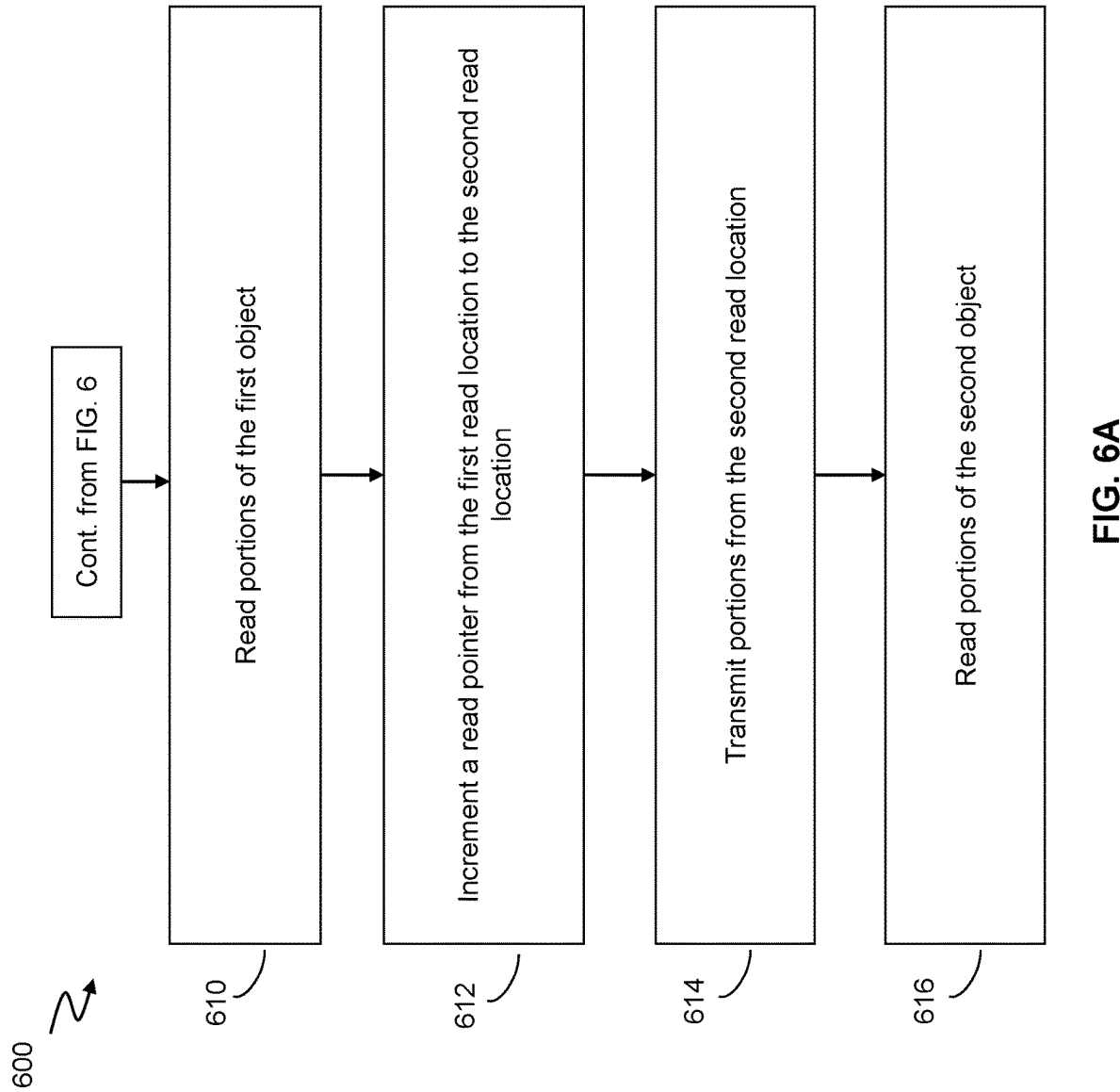

Referring now to FIGS. 6-6A method 600 for reading data sequentially on a media begins at block 602, identifying, by a head server 102 in communication with a plurality of storage devices 122a-122n, a first read location corresponding to a first plurality of portions 220 of a first object 112a. For example, the first object 112a can include data or a data structure generated by a client device 110. The client device 110 can transmit the first object 112a to the head server 102 to be stored. The first object 112a can correspond to data segmented or broken into multiple fragments or objects stored across different locations (e.g., read locations) or storage media. For example, the first object 112a can be stored at and maintained at a first read location of at least one storage device 122 of the plurality of storage devices 122a-122n. The head server 102 can identify the first read location where the first object 112a is stored, for example, using a location identifier or storage device identifier that includes an address or location data for the first object 112a.

In embodiments, the head server 102 can identify or determine the first read location using metadata corresponding to the first object 112a. Each of the portions 220 can be referred to herein as slices of the respective object and each slice can include a header portion and a metadata portion. The metadata portion can include data corresponding to the respective object the slice originated from and a location or address of the respective storage device the portion is stored on. For example, the metadata portion can include a read location corresponding to a first plurality of portions 222 of the first object 112a and at least one storage device 122 for the read location.

At block 604, the head server 102 can determine a first length of the first plurality of portions 220 of the first object 112a. For example, the head server 102 can divide or partition the first object 112a into a first plurality of portions 220. The number of portions for the first plurality of portions 220 can vary and can be selected based in part on a size or length of the first object 112a. In some embodiments, each of the first plurality of portions can have the same length. In some embodiments, one or more portions of the first plurality of portions can have a different length from one or more other portions of the first plurality of portions.

In embodiments, the head server 102 can determine the first length using a header or metadata corresponding to the first object 112a. For example, the header portion of the first plurality of portions can include an indication or a value for the first length of the first plurality of portions 220 of the first object 112a. The header portion can include data corresponding to a length (e.g., first length.) of the respective portion.

At block 606, the head server 102 can identify a second read location corresponding to a second plurality of portions 222 of a second object 112b using the first length. The second object 112b can include data or a data structure generated by a client device 110. The client device 110 can transmit the second object 112b to the head server 102 to be stored. The second object 112b can correspond to data segmented or broken into multiple fragments or objects stored across different locations (e.g., read locations) or storage media. For example, the second object 112b can be stored at and maintained at a second read location of at least one storage device 122 of the plurality of storage devices 122a-122n. The head server 102 can identify the second read location where the second object 112b is stored, for example, using a location identifier or storage device identifier that includes an address or location data for the second object 112b.

The head server 102 can identify a second read location corresponding to a second plurality of portions 222 of a second object 112b using the first length. For example, the second read location can be spaced from the first read location a number of storage addresses corresponding to the first length. Thus, responsive to determining the first read location and the first length, the head sever 102 can identify or determine the second read location using the first read location and the first length. In embodiments, the second read location can be the same for each of the second subset of the plurality of storage devices 122.

In embodiments, the head server 102 can identify or determine the second read location using metadata corresponding to the second object 112b. The metadata portion can include data corresponding to the respective object the slice originated from and a location or address of the respective storage device the portion is stored on. For example, the metadata portion can include a read location corresponding to a second plurality of portions 222 of the first object 112b and at least one storage device 122 for the read location.

At block 608, respective ones of the first subset of the plurality of storage devices 122 can transmit each of the first plurality of portions 222 from the first read location to the head server 102. The first plurality of portions 222 can be stored at multiple storage devices 122. For example, in some embodiments, the first plurality of portions 220 (e.g., first portions) can be stored or spread across over 20 storage devices 120, 122 with 16 of the storage devices 120, 122 receiving data and 4 of the storage devices 120, 122 receiving redundant data. In one embodiment, the storage devices 120, 122 can be grouped together in groups of 20 storage devices and be referred to as pods. The head server 102 can identify the storage devices 122 storing or having one or more portions 220 of the first plurality of portions 220 and transmit a request for the respective portions 220. The storage devices 122 can receive the request and transmit to the head server 102 the one or more portions 220 of the first plurality of portions 220. In some embodiments, the first plurality of portions 222 can be stored at a single storage device 122. The single storage device 122 can transmit the first plurality of portions 222 to the head server 102. The head server 102 can identify the single storage device 122 storing or having one or more portions 220 of the first plurality of portions 220 and transmit a request for the respective portions 220. The single storage device 122 can receive the request and transmit to the head server 102 the one or more portions 220 of the first plurality of portions 220.

At block 608, the head server 102 can read the first plurality of portions 220 of the first object from the first subset of plurality of storage devices 120. In some embodiments, the head server 102 can read the first plurality of portions 220 forming the first object 112a from the first subset of the plurality of storage devices 122 in a first contiguous order. For example, the head server 102 can organize the first subset of the plurality of storage devices 122 in a first contiguous order. The head server 102 can read back the portions 220 corresponding to the first object 112a in the same order or arrangement the respective portions 220 were stored in at the one or more storage devices 122. In some embodiments, the head server 102 can read the first plurality of portions 220 forming the first object 112a from the first subset of the plurality of storage devices 122 in a first sequential order. For example, the head server 102 can organize the first subset of the plurality of storage devices 122 in a first sequential order and read back the portions 220 corresponding to the first object 112a in sequential order.

At block 610, the head server 102 can increment a read pointer from the first read location to the second read location based on the first length. The head server 102, responsive to reading the first plurality of portions 220 forming the first object 112a from the first subset of the plurality of storage devices 122, can increment the read pointer to the second read location corresponding to the second object 112b.

At block 612, respective ones of the second subset of the plurality of storage devices 120, 122 can transmit each of the second plurality of portions 222 from the second read location to the head server 102. The second plurality of portions 222 can be stored at multiple storage devices 120, 122. For example, in some embodiments, the second plurality of portions 220 (e.g., second portions) can be stored or spread across over 20 storage devices 120, 122 with 16 of the storage devices 120, 122 receiving data and 4 of the storage devices 120, 122 receiving redundant data. In one embodiment, the storage devices 120, 122 can be grouped together in groups of 20 storage devices and be referred to as pods. The head server 102 can identify the storage devices 122 storing or having one or more portions 220 of the second plurality of portions 220 and transmit a request for the respective portions 220. The storage devices 120, 122 can receive the request and transmit to the head server 102 the one or more portions 220 of the second plurality of portions 220. In some embodiments, the second plurality of portions 222 can be stored at a single storage device 120, 122. The single storage device 120, 122 can transmit the second plurality of portions 222 to the head server 102. The head server 102 can identify the single storage device 120, 122 storing or having one or more portions 220 of the second plurality of portions 220 and transmit a request for the respective portions 220. The single storage device 120, 122 can receive the request and transmit to the head server 102 the one or more portions 220 of the first plurality of portions 220.

At block 614, the head server 102 can read the second plurality of portions 220 of the second object 112b from the first subset of plurality of storage devices 120, 122. In some embodiments, the head server 102 can read the first plurality of portions 220 forming the second object 112b from the second subset of the plurality of storage devices 120, 122 in a second contiguous order. For example, the head server 102 can organize the second subset of the plurality of storage devices 120, 122 in a second contiguous order. The head server 102 can read back the portions 220 corresponding to the second object 112b in the same order or arrangement the respective portions 220 were stored in at the one or more storage devices 120, 122. In some embodiments, the head server 102 can read the second plurality of portions 220 forming the second object 112b from the first subset of the plurality of storage devices 122 in a second sequential order. For example, the head server 102 can organize the second subset of the plurality of storage devices 120, 122 in a second sequential order and read back the portions 220 corresponding to the second object 112b in sequential order.

In some embodiments, the head server 102 can combine the portions 220 of the first object 112a and the second object 112b to form the first object 112a and the second object 112b, respectively. For example, the head server 102 can combine the first plurality of portions 220 to form the first object 112a and can combine the second plurality of portions 220 to form the second object 112b.

The head server 102 can store the first read location corresponding to the first plurality of portions 220 and the second read location corresponding to the second plurality of portions 220 to a storage media independent from the plurality storage devices 120, 122. For example, the head server 102 can store read location data or address information on a temporary storage medium that is independent of the head server 102 and the plurality of storage devices 120, 122. The temporary storage medium can include or be executing on a remote server, remotely located from the head server 102 and the plurality of storage devices 120, 122. The head server 102 can store read location data or address information on a long-term storage medium. In some embodiments, the long-term storage medium can include the pointer server having a database to store write and read locations. In embodiments, the head server 102 can extract the first read location corresponding to the first plurality of portions 220 of the first object 112a and the second read location corresponding to the second plurality of portions 220 of the second object 112b from the storage media independent from the plurality storage devices 120, 122. The head server 102 can identify the first read location for a first one of the first plurality of portions 220 of the first object 112a from the storage media independent from the plurality storage devices 120, 122. The head server 102 can identify the second read location for a first one of the second plurality of portions 220 of the second object from the storage media independent from the plurality storage devices.

The head server 102 can use the read locations to read back the respective portions 220 of the first object 112a and the second object 112b from the respective storage devices 120, 122. In some embodiments, the head server 102 can read one of the plurality of the first portions 220 from a first block stored on the temporary storage medium. The head server 102 can read one of the plurality of the second portions 220 from the first block stored on the temporary storage medium.

In some embodiments, the first object 112a and the second object 112b can be encrypted. In some embodiments, the first plurality of portions 220 of the first object 112a can be encrypted and the second plurality of portions 220 of the second object 112b can be encrypted. The first object 112a and the second object 112b can be encrypted prior to storing in a storage device 120, 122 or the storage media independent from the plurality storage devices 120, 122. The first plurality of portions 220 of the first object 112a can be encrypted and the second plurality of portions 220 of the second object 112b can be encrypted prior to storing in a storage device 120, 122 or the storage media independent from the plurality storage devices 120, 122. The head server 102 identify metadata corresponding to the first object 112a and/or the second object 112b stored in at least one entry of the storage media independent from the plurality storage devices 120, 122. In some embodiments, the metadata can include one or more encryption codes or encryption keys for the first object 112a and/or the second object 112b. The metadata can include one or more encryption codes or encryption keys for the first plurality of portions of the first object 112a and/or the second plurality of portions of the second object 112b. The head server 102 can determine an encryption code or encryption key for the first object 112a and/or the second object 112b. The head server 102 can determine an encryption code or encryption key for the first plurality of portions of the first object 112a and/or the second plurality of portions of the second object 112b. The head server 102 can decrypt the first object 112a and/or the second object 112b using the encryption code or the encryption key. The head server 102 can decrypt the first plurality of portions of the first object 112a and/or the second plurality of portions of the second object 112b using the encryption code or the encryption key.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method to store data sequentially on a media comprising:
   receiving, by a head server in communication with a plurality of storage devices, a first object and a second object;
   dividing, by the head server, the first object into a first plurality of portions and the second object into a second plurality of portions, wherein each of the first plurality of portions have a first length and each of the second plurality of portions have a second length;
   transmitting, by the head server, each of the first plurality of portions to a respective one of the first subset of the plurality of storage devices;
   writing, by each of a first subset of the plurality of storage devices, a respective one of the first plurality of portions to a first write location indicated by a write pointer, wherein the first write location is the same for each of the first subset of the plurality of storage devices;
   incrementing, by the head server, the write pointer to a second write location based on the first length;
   transmitting, by the head server, each of the second plurality of portions to a respective one of the second subset of the plurality of storage devices; and
   writing, by each of a second subset of the plurality of storage devices, a respective one of the second plurality of portions to the second write location, wherein the second write location is the same for each of the second subset of the plurality of storage devices.

2. The method of claim 1, further comprising storing the first write location corresponding to the first plurality of portions and the second write location corresponding to the second plurality of portions to a storage media independent from the plurality storage devices.

3. The method of claim 1, further comprising writing each of the first plurality of portions and each of the second plurality of portions with disk media using shingled magnetic recording (SMR) disk drives.

4. The method of claim 1, further comprising:
   randomly assigning the first plurality of portions to the first subset of the plurality of storage devices using a first hash calculation; and
   randomly assigning the second plurality of portions to the second subset of the plurality of storage devices using a second hash calculation.

5. The method of claim 1, further comprising writing an indication of the first length to a header of the first plurality of portions and writing an indication of the second length to a header of the second plurality of portions.

6. The method of claim 1, further comprising:
   duplicating one of the first plurality of portions to one of the plurality of storage devices not in the first subset of the plurality of storage devices.

7. The method of claim 1, further comprising:
   generating an encryption key for the first object;
   encrypting the first object with the encryption key; and
   recording the encryption key with the first write location.

8. The method of claim 7, further comprising encrypting the encryption key with an account-specific encryption key prior to recording the encryption key with the first write location.

9. The method of claim 1, further comprising:
writing, by one of the plurality of storage devices, one of the plurality of the first portions to a first block stored on a temporary storage medium;
writing, by the one of the plurality of storage devices, one of the plurality of the second portions to the first block stored on the temporary storage medium; and
writing, by the one of the plurality of storage devices, the first block to a long-term storage medium.

10. The method of claim 1, wherein the second subset of the plurality of storage devices is different than the first subset of the plurality of storage devices.

11. A system to store data sequentially on a media, comprising:
a head server in communication with a plurality of storage devices, the head server configured to:
receive a first object and a second object;
divide the first object into a first plurality of portions and the second object into a second plurality of portions, wherein each of the first plurality of portions have a first length and each of the second plurality of portions have a second length;
transmit each of the first plurality of portions to a respective one of a first subset of the plurality of storage devices;
increment a write pointer from a first write location to a second write location based on the first length; and
transmit each of the second plurality of portions to a respective one of a second subset of the plurality of storage devices; and
the first subset of the plurality of storage devices configured to:
write a respective one of the first plurality of portions to the first write location indicated by the write pointer, wherein the first write location is the same for each of the first subset of the plurality of storage devices; and
the second subset of the plurality of storage devices configured to:
write a respective one of the second plurality of portions to the second write location, wherein the second write location is the same for each of the second subset of the plurality of storage devices.

12. The system of claim 11, further comprising a storage media independent from the plurality of storage devices to store the first write location corresponding to the first plurality of portions and the second write location corresponding to the second plurality of portions.

13. The system of claim 11, wherein the first subset of the plurality of storage devices configured to write each of the first plurality of portions and the second subset of the plurality of storage devices configured to write each of the second plurality of portions with disk media using shingled magnetic recording (SMR) disk drives.

14. The system of claim 11, wherein the head server is configured to:
randomly assign the first plurality of portions to the first subset of the plurality of storage devices using a first hash calculation; and
randomly assign the second plurality of portions to the second subset of the plurality of storage devices using a second hash calculation.

15. The system of claim 11, wherein the first subset of the plurality of storage devices configured to write an indication of the first length to a header of the first plurality of portions; and
the second subset of the plurality of storage devices configured to write an indication of the second length to a header of the second plurality of portions.

16. The system of claim 11, wherein the first subset of the plurality of storage devices configured to duplicate one of the first plurality of portions to one of the plurality of storage devices not in the first subset of the plurality of storage devices.

17. The system of claim 11, wherein the head server is configured to:
generate an encryption key for the first object;
encrypt the first object with the encryption key; and
record the encryption key with the first write address.

18. The system of claim 17, wherein the head server is configured to encrypt the encryption key with an account-specific encryption key prior to recording the encryption key with the first write address.

19. The system of claim 11, wherein at least one of the plurality of storage devices is configured to:
write one of the plurality of the first portions to a first block stored on a temporary storage medium;
write one of the plurality of the second portions to the first block stored on the temporary storage medium; and
write the first block to a long-term storage medium.

20. The system of claim 11, wherein the second subset of the plurality of storage devices is different than the first subset of the plurality of storage devices.

* * * * *